United States Patent
Kasahara et al.

(12) 
(10) Patent No.: US 6,687,028 B1
(45) Date of Patent: Feb. 3, 2004

(54) IMAGE EXPOSURE APPARATUS

(75) Inventors: Kazuo Kasahara, Hino (JP); Eiji Ito, Hino (JP); Atsushi Suzuki, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/559,859

(22) Filed: Apr. 27, 2000

(30) Foreign Application Priority Data

Apr. 28, 1999 (JP) ............................................. 11-121387

(51) Int. Cl.[7] .............................. H04N 1/46; H04N 1/04; H04N 1/00; H04N 7/18; H04N 3/26; H01J 3/14
(52) U.S. Cl. ....................... 358/509; 358/475; 358/496; 358/406; 348/745; 348/131; 250/234; 250/236
(58) Field of Search ................................. 358/496, 475, 358/509, 406; 348/745, 131; 250/234, 236

(56) References Cited

U.S. PATENT DOCUMENTS

| | | | |
|---|---|---|---|
| 5,177,501 A | | 1/1993 | Seyfried |
| 5,592,306 A | * | 1/1997 | Cheng ........................ 358/464 |
| 5,625,403 A | * | 4/1997 | Hazman ..................... 347/239 |
| 5,703,671 A | | 12/1997 | Narita et al. |
| 5,726,739 A | * | 3/1998 | Hayata ........................ 355/67 |
| 6,282,396 B1 | * | 8/2001 | Iwata et al. ................. 399/301 |

FOREIGN PATENT DOCUMENTS

| | | |
|---|---|---|
| EP | 0 325 361 A2 | 7/1989 |
| JP | 63-309474 | 12/1988 |
| JP | 04-344265 | 11/1992 |

* cited by examiner

Primary Examiner—Edward Coles
Assistant Examiner—Houshang Safaipour
(74) Attorney, Agent, or Firm—Frishauf, Holtz, Goodman & Chick, P.C.

(57) ABSTRACT

An image exposing apparatus for exposing an image onto a light sensitive material, is provided with a plurality of light beam emitting element arrays, each light beam emitting element array emitting aligned-light beams which are aligned in at least a single line; a light mixing device for mixing a plurality of aligned-light beams emitted from the plurality of light beam emitting element arrays and for emitting mixed-aligned-light beams which are aligned in the same line; a light receiving device located so as to receive the mixed-aligned-light beams at a position where the light sensitive material is exposed; and an adjusting device for adjusting a position of each of the plurality of light beam emitting element arrays based on a light receiving result by the light receiving means.

14 Claims, 17 Drawing Sheets

FIG. 12

| Inter I | LIGHT QUANTITY | TOTAL LIGHT QUANTITY |
|---|---|---|
| Inter 2 - 1 | | |
| Inter 2 - 2 | | |
| Inter 4 - 1 | | |
| Inter 4 - 2 | | |
| Inter 4 - 3 | | |
| Inter 4 - 4 | | |
| Inter 8 - 1 | | |
| Inter 8 - 2 | | |
| Inter 8 - 3 | | |
| Inter 8 - 4 | | |
| Inter 8 - 5 | | |
| Inter 8 - 6 | | |
| Inter 8 - 7 | | |
| Inter 8 - 8 | | |

TRANSPORTING DIRECTION

LINE-SHAPED EMERGING LIGHT OF DESIRED DENSITY

IMAGE EXPOSURE APPARATUS

BACKGROUND OF THE INVENTION

This invention relates to an improvement in the adjustment of an image exposure apparatus which makes exposure for photosensitive materials using a light emitted from a plurality of light emitting elements of plural colors.

There are image exposure apparatus which are equipped with an array light source composed of a plurality of light emitting elements for each of the recording colors and make exposure for photosensitive materials (such as photographic papers).

FIG. 17 is an illustration showing how exposure is carried out in a conventional image exposure apparatus of this kind. In this apparatus, in order to make exposure for a photographic paper 11, there are provided array light sources 1, 2, and 3 having about the same width as the photographic paper 11. In the example shown here, vacuum fluorescent tubes are used for the array light sources, and each of the array light sources 1, 2, and 3 is composed of two lines of a zigzag arrangement of 20 elements. Besides, in the case where LED's are used for an array light source, the elements have a straight line structure.

In the above-described example, the array light sources 1, 2, and 3 are ones emitting lights corresponding to the respective recording colors of R, G, and B. Further, exposures for R, G, and B are made at the same positions of the photographic paper 11 by actuating each of the array light sources 1, 2, and 3 at timings shifted in accordance with the transport speed while the photographic paper 11 is being transported in the direction of the arrow mark in the drawing.

Moreover, it is desirable that there is a light source which can emit at a time line-shaped light dots having a desired density as shown in FIG. 18. For example, in the case where the line-shaped light dots having a density of 100 dots per a line is necessary, 100 elements for R, 100 elements for G, and 100 elements for R are necessary, which means that it is necessary to make a light source having total 300 elements arranged in a line. That is, for a light source to obtain a light emission of 100 dots per line, 300 dots per line is the desired density.

However, because there is a limit in the size of the light emitting element, it is difficult to arrange all the elements in a line. For this reason, as described in the above, the exposure is made in a structure such that array light sources are provided for the respective colors to make exposures sequentially.

Generally speaking, because a bundle of rays from an array light source is divergent, it is necessary to form an image of the light source on the photographic paper, or to make the light source become in close contact with the photographic paper.

Because the light sources are in close contact with the paper in this way, or because the brightness of the image decreases if the image forming surface is let away in the case where the image of the light source is formed on the photographic paper, it has been necessary as an actual matter that the exposure is carried out with an arrangement of array light sources 1, 2, and 3 shifted from one another as shown in FIG. 17.

In the case where the exposure is made with such an arrangement of the array light sources for the respective recording colors shifted from one another, it is necessary to shift the timing of the driving signals supplied to the respective array light sources 1, 2, and 3 in accordance with the transport speed of the photographic paper. For this reason, there is a problem that the structure of the driving circuit and the timing control are made complex.

Further, if a fluctuation of transport speed occurs after an exposure for a certain recording color before the next exposure for another color with respect to the same pixels is carried out, it produces a color deviation. Accordingly, in order to prevent the color deviation, it has been necessary to control strictly the transport speed of the photographic paper 11.

Further, because a minute movement of the photographic paper 11 in the direction perpendicular to the transporting plane becomes a cause to produce a color deviation owing to the variation of the size of the image of the pixel on the photographic paper, it is necessary to keep the position of the transporting plane precisely. However, a mechanism for keeping the transporting plane precisely as described in the above is necessary for each of the above-described three light sources, and it is also necessary that the mechanism covers the range extending over the all light sources (the range A shown in FIG. 19). Moreover, it has been necessary also a mechanism suppressing the movement of the paper in the direction perpendicular to the transporting in the transporting plane during an interval until the next exposure for another color with respect to the same pixels is carried out.

That is, as shown in FIG. 19, in the cases where recording is made with an arrangement of array light sources 1, 2, and 3 for the respective recording colors, there has been a situation that an exposure without a color deviation and unevenness of color is difficult.

For the reasons described in the above, it is also thinkable to carry out exposure for the photographic paper 11 after combining line-shaped emitted lights beforehand; however, for such a case, nothing has been considered with respect to the points how the line-shaped emitted lights are combined, and how the state of the deviation and the focusing of the combined line-shaped lights are detected and adjusted.

SUMMARY OF THE INVENTION

This invention has been done in view of the above-described technical problems, and it is an object of the invention to provide an image exposure apparatus which makes the structure of the driving circuit and the timing control easy, produces no color deviation even if a fluctuation of transport speed occurs, and is easy to be adjusted.

That is, this invention for solving the above-described problems is such one as described in the following structures.

(1) An image exposing apparatus for exposing an image onto a light sensitive material, comprises:
  a plurality of light beam emitting element arrays, each light beam emitting element array emitting aligned-light beams which are aligned in at least a single line;
  light mixing means for mixing a plurality of aligned-light beams emitted from the plurality of light beam emitting element arrays and for emitting mixed-aligned-light beams which are aligned in the same line;
  light receiving means located so as to receive the mixed-aligned-light beams at a position where the light sensitive material is exposed; and
  adjusting means for adjusting a position of each of the plurality of light beam emitting element arrays based on a light receiving result by the light receiving means.

(2) In the image exposing apparatus of (1), the position adjusting means conducts an exposing position adjustment for adjusting an exposing position of each of the plurality of aligned-light beams emitted from the plurality of light beam emitting element arrays and a focusing position of each of the plurality of aligned-light beams at the position where the light sensitive material is exposed.

(3) In the image exposing apparatus of (1), the light receiving means receives light beams in order to conduct a control for light emission intensity of the plurality of light beam emitting element arrays and in order to conduct an exposing position adjustment and a focusing position adjustment.

(4) In the image exposing apparatus of (1), the light receiving means is detachably provided to the image exposing apparatus.

(5) In the image exposing apparatus of (1), wherein the light receiving means comprises CCD (charge-coupled device).

(6) The image exposing apparatus of (1), the adjusting means corrects a light amount for each element of the plurality of light beam emitting element arrays based Qn the light receiving result by the light receiving means.

(7) In the image exposing apparatus of (1), the light receiving means comprises light receiving elements and an optical system to transmit light beams emitted on an image forming surface of the plurality of light beam emitting element arrays and to focus the transmitted light beams on an image forming surface of the light receiving elements.

(8) In the image exposing apparatus of (5), the CCD is a line CCD.

(9) In the image exposing apparatus of (8), the light receiving means has a structure that the line CCD is inclined so as to cover an arrangement width of zigzag-arranged light beam emitting element array and a warping width of a light beam emitting element array.

(10) In the image exposing apparatus of (7), wherein the optical system comprises a scanning mirror to scan the image forming surface of the image forming surface of the plurality of light beam emitting element arrays.

(11) In the image exposing apparatus of (7), the light receiving means further comprises color filters to adjust a sensitivity for respective colors.

(12) In the image exposing apparatus of (7), the light receiving means detects positional deviations along a sub-scanning direction perpendicular to the light beam emitting element array and automatically produces control parameters.

(13) In the image exposing apparatus of (7), the light receiving means detects focusing errors as positional deviations in an optical axis.

(14) In the image exposing apparatus of (7), wherein the light receiving means detects an inclination and a warp in the light beam emitting element array.

Further, the above object may be attained by the following preferable structures.

This invention is an image exposure apparatus which makes image exposure for photosensitive materials using a plurality of light emitting element arrays, comprising light mixing means for mixing lights emitted from said plurality of light emitting element arrays to form mixed line-shaped emerging lights on one and the same line, light receiving means for receiving the line-shaped emerging lights obtained through mixing by said light mixing means at the position where said photosensitive materials are subjected to an exposure, and adjusting means for adjusting the positions of said light emitting element arrays on the basis of the result of receiving the light by said light receiving means.

Besides, it is desirable that the aforesaid adjusting means makes the adjustment of the exposure positions of the line-shaped emitted lights from the aforesaid plurality of light emitting element arrays, and the focus adjustment at the position of exposure of the aforesaid photosensitive materials to the aforesaid mixed line-shaped emerging lights.

In this invention; bundles of rays from a plurality of array light sources are mixed by a light mixing means and made to emerge from it, to form line-shaped emerging lights composed of a plurality of mixed bundles of rays. Further, through making the adjustment of the positions of the light emitting element arrays by the adjusting means, adjustment to correct positions and focus adjustment are made possible.

Accordingly, because the bundles of rays from the respective array light sources are put together to make exposure for one line, it is actualized an image exposure apparatus which has a simple structure of the driving circuit and an easy timing control, produces no color deviation even if a fluctuation of transport speed occurs, and is easy to be adjusted.

Moreover, it is possible for the light receiving means to receive a light for both of the purposes, that is, the control of the light emission intensity of the light emitting element arrays and the adjustment of the exposure positions and the focuses. In other words, it is possible to use the light receiving means for controlling the light emission intensity of the light emitting element arrays in the adjustment of the exposure positions and the focuses.

Further, there may take place positional dispersion in light emitting position in a light beam emitting element array in which this dispersion can not be adjusted by the adjustment for the light beam emitting element array and adjustment dispersion in adjustment result caused by adjustment. However, with the above structure, it is possible to add means for automatically correcting the positional dispersion and the adjustment dispersion on the basis of the detection result of the light receiving means.

BRIEF DESCRIPTION OF THE DRAWINGS

FIG. 12 is a drawing showing a table for comparing the light quantity depending on the emission pattern of the light emitting element arrays;

DETAILED DESCRIPTION OF THE PREFERRED EMBODIMENT

In the following, examples of the embodiment of this invention will be explained in detail. In addition, this invention should not be limited to the examples of the embodiment shown in the specification of this application.

First, the overall structure of the image exposure apparatus which is used in the examples of the embodiment will be explained with reference to FIG. 1 to FIG. 3.

Figure 1:
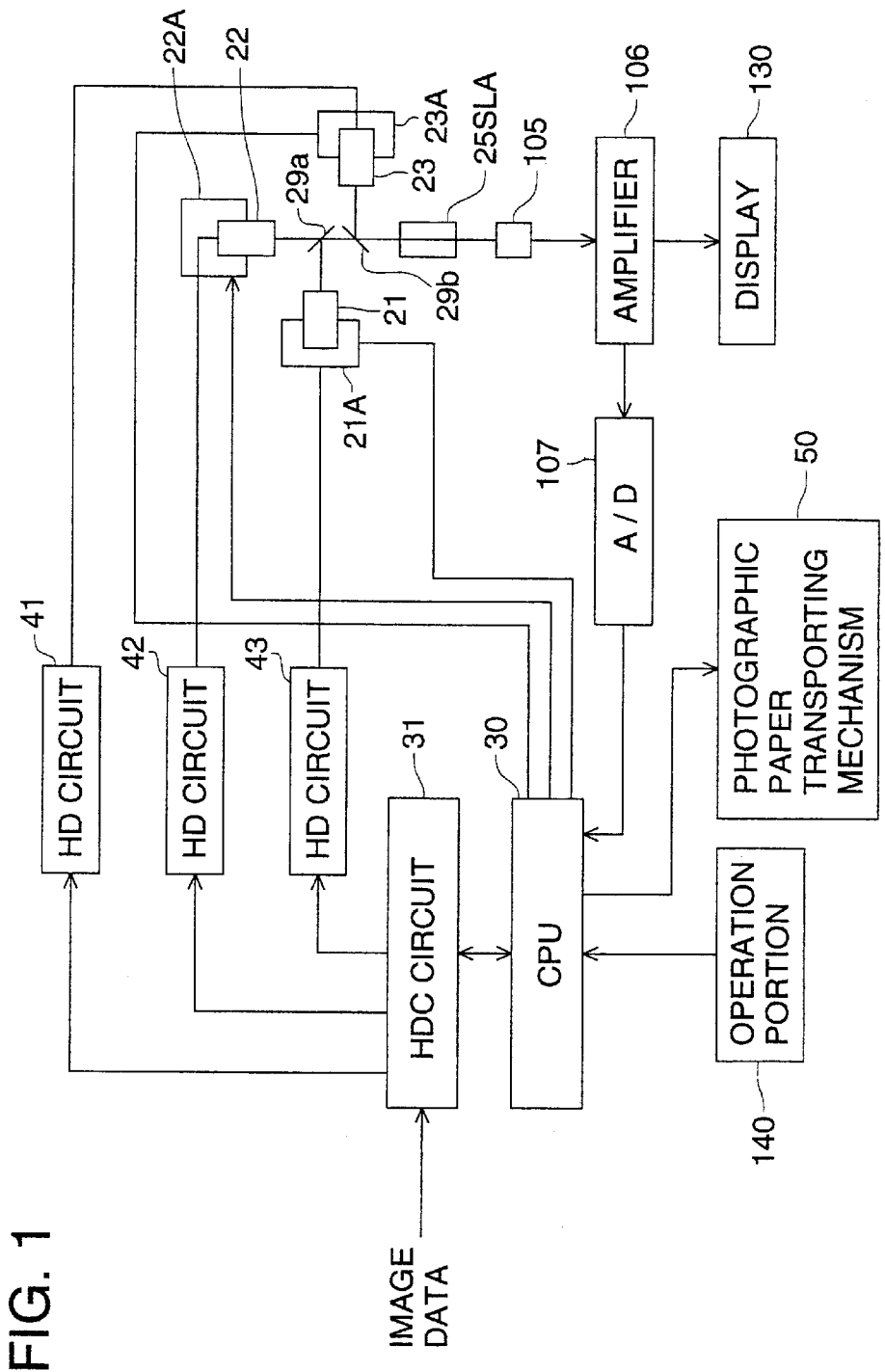
FIG. 1 is a drawing showing the structure of an image exposure apparatus of an example of the embodiment of this invention.
Figure 2:
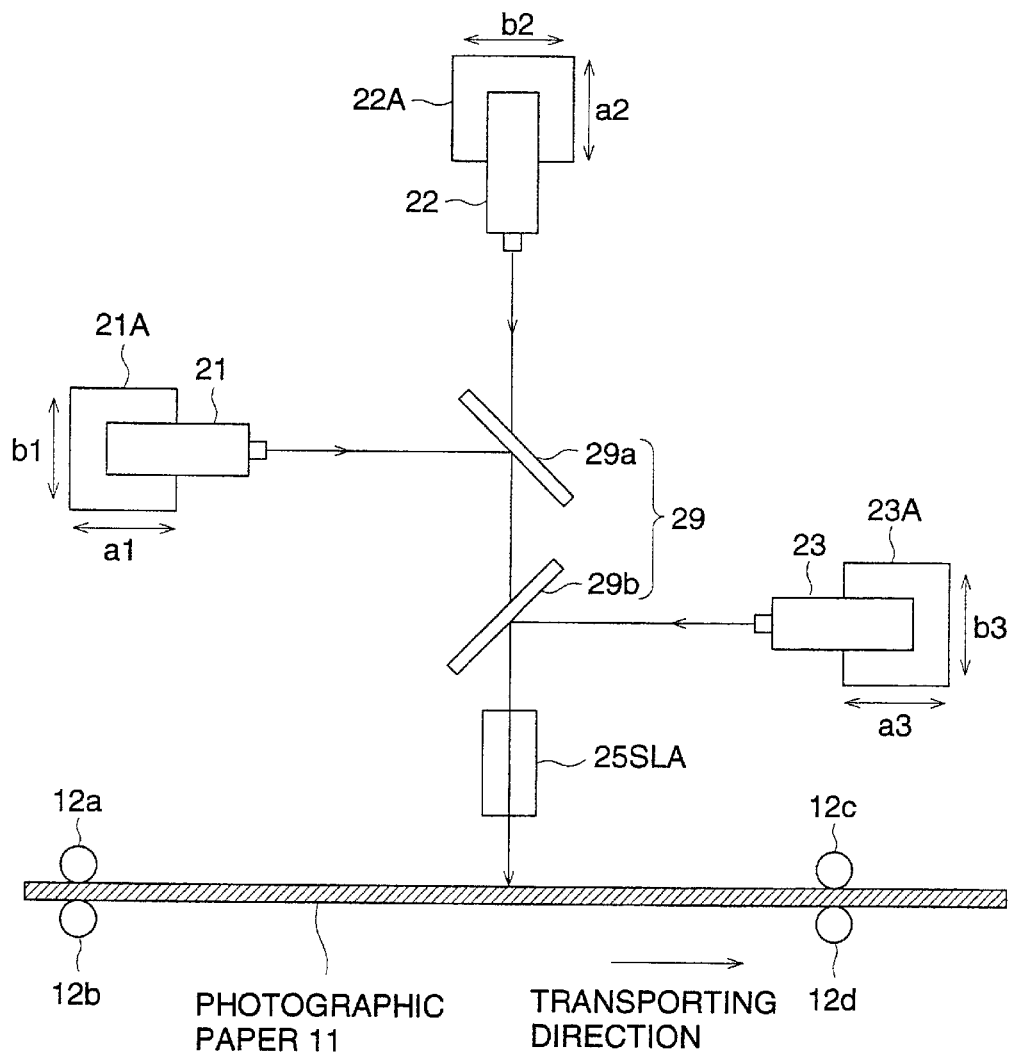
FIG. 2 is a side view showing the structure of an image exposure apparatus of an example of the embodiment of this invention.
Figure 3:
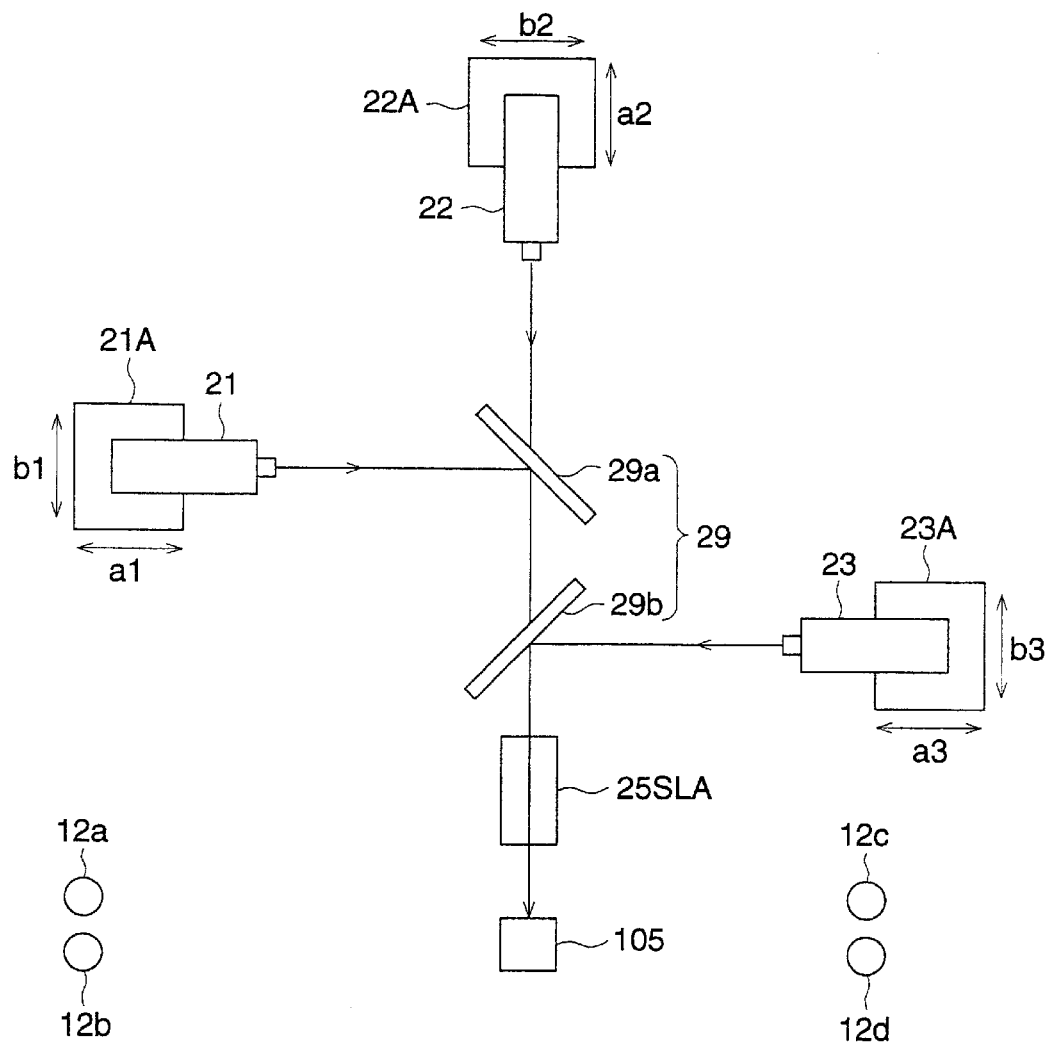
FIG. 3 is a side view showing the structure of an image exposure apparatus of an example of the embodiment of this invention.

Now, FIG. 1 is a block diagram showing the electrical structure (at the time of adjustment) of the image exposure apparatus of an example of the embodiment, FIG. 2 is a side view showing schematically the mechanical structure (at the time of paper transporting) of the main part of the image exposure apparatus of an example of the embodiment, and FIG. 3 is a side view showing schematically the mechanical structure (at the time of adjustment) of the main part of the image exposure apparatus of an example of the embodiment.

At first, FIG. 2 at the time of paper transporting will be explained. 12a and 12b denote a pair of driving rollers for transporting the photographic paper 11 at a predetermined transport speed, and 12c and 12d denote also a pair of driving rollers for transporting the photographic paper 11 at the predetermined transport speed.

In addition, the photographic paper 11 used in this example of the embodiment is one of photosensitive materials, and in the first example of the embodiment, an apparatus which makes exposure for the photographic paper 11 is used as a concrete example.

Further, in FIG. 1 to FIG. 3, 21 denotes the first array light source composed of array-shaped light emitting elements for carrying out exposure with respect to the first color (R for example), 22 denotes the second array light source composed of array-shaped light emitting elements for carrying out exposure with respect to the second color (G for example), and 23 denotes the third array light source composed of array-shaped light emitting elements for carrying out exposure with respect to the third color (B for example).

Further, 29 denotes a light mixing means for mixing the bundles of rays from the array light sources for the respective recording colors and making the bundles of rays for the respective recording colors emerge on the same optical path, and is composed of the dichroic mirror 29a and the dichroic mirror 29b both having a wavelength selecting characteristic.

In this example, the dichroic mirror 29a is supposed to reflect the light of the wavelength from the first array light source 21 and to transmit the light of the wavelength from the second array light source 22. Further, the dichroic mirror 29b is supposed to transmit the light of the wavelengths from the first array light source 21 and the second array light source 22 and to reflect the light of the wavelength from the third array light source 23.

Numeral 25 denotes a SELFOC lens array as a light converging means for converging the bundles of rays for the respective recording colors emerging from the light mixing means 29 on the photosensitive material.

Further, these first array light source 21 to third array light source 23 should be composed of an array light source of a zigzag arrangement like a conventional array light source. Further, the apparatus has a structure such that, at the incident sides of the above-described light mixing means, the first array light source 21, the second array light source 22, and the third array light source 23 are mounted respectively, and the emerging lights from the emerging side of the light mixing means 29 are converged on the photographic paper 11 for exposure by the SELFOC lens array 25.

Besides, the array light source referred to herein means an array of light emitting elements which are able to be controlled for their light emission independently at the portions corresponding to the respective pixels, and instead of a light emitting element array composed of a plurality of light emitting elements (such as LED's) capable of being controlled for their light emission independently for the respective corresponding pixels, it is possible to use, for example, a light emitting means (such as a PLZT) having a shutter means capable of being controlled independently at the portions corresponding to the respective pixels and a single light emitting means combined together.

Further, 21A denotes a position adjusting means for adjusting the positional deviation of the array light source 21 (in the direction of b1) and the focus (in the direction of a1), 22A denotes a position adjusting means for adjusting the positional deviation of the array light source 22 (in the direction of b2) and the focus (in the direction of a2), and 23A denotes a position adjusting means for adjusting the positional deviation of the array light source 23 (in the direction of b3) and the focus (in the direction of a3).

In the above, in adjusting the focus, the array light source is moved in the direction of the optical axis, and in adjusting the exposure position, the array light source is moved in the direction perpendicular to both of the optical axis direction and the lengthwise direction of the light emitting element array.

Numeral 30 denotes the CPU as a control means for controlling the various portions, 31 denotes the head driver control circuit (HDC circuit) generating image signals for the respective colors for driving the array light sources through receiving image data from the outside, 41 denotes the head driver circuit (HD circuit) generating an emission signal for making the light emitting elements of the array light source 21 emit lights in accordance with the gradation through receiving the image signal for the first color from the HDC circuit 31, 42 denotes the head driver circuit (HD circuit) generating an emission signal for making the light emitting elements of the array light source 22 emit lights in accordance with the gradation through receiving the image signal for the second color from the HDC circuit 31, and 43 denotes the head driver circuit (HD circuit) generating an emission signal for making the light emitting elements of the array light source 23 emit lights in accordance with the gradation through receiving the image signal for the third color from the HDC circuit 31.

Numeral 50 denotes the photographic paper transporting mechanism composed of a driving motor, the driving roller pairs 12*a* and 12*b*, and 12*c* and 12*d*, etc. 105 denotes the image sensor as a light receiving means having a two-dimensional light receiving portion for adjusting the focuses. Besides, it is desirable that this image sensor 105 is made up of a means capable of detecting multiple colors such as a color CCD image sensor. Further, the result of receiving lights by the image sensor 105 is amplified by the amplifier 106, being converted into digital data by the A/D converter 107, and is supplied to the CPU 30.

Numeral 130 denotes the display as a display means for displaying the result of receiving lights by the image sensor 105, and 140 denotes the operation portion as an inputting means for carrying out various kinds of inputting operation.

Figure 4:
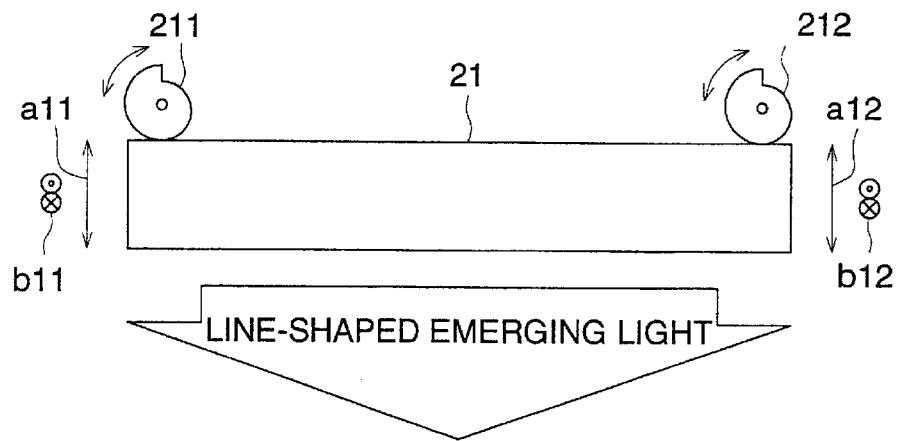
FIG. 4 is a drawing showing an example of the structure of the main part of an image exposure apparatus of an example of the embodiment of this invention.

FIG. 4 is an illustration showing the structure of the position adjusting means. In this drawing is shown the position adjusting means 21A for adjusting the exposure position and the focus of the first array light source 21.

There is shown the structure which is capable of adjusting the focus by the independent movements a11 and a12 at the both ends of the first array light source 21 for the movement in the al direction for adjusting the focus in FIG. 2 and FIG. 3. That is, there are provided the eccentric cam 211 as a position adjusting means for adjusting the focus in the all direction and the eccentric cam 212 as a position adjusting means for adjusting the focus in the a12 direction.

Further, it is appropriate to provide two eccentric cams (not shown in the drawing) for making it possible to adjust the focus by the independent movements b11 and b12 at the both ends of the first array light source 21 for the movement in the b1 direction for adjusting the focus in FIG. 2 and FIG. 3. Moreover, it is appropriate to provide a position adjusting means using similar eccentric cams also in the second array light source and in the third array light source. In addition, these eccentric cams are controlled by the CPU 30.

Further, it is possible to use various kinds of position adjusting means such as an actuator, a voice coil motor, and an ultrasonic motor, instead of the eccentric cams shown in the drawing.

Figure 5:
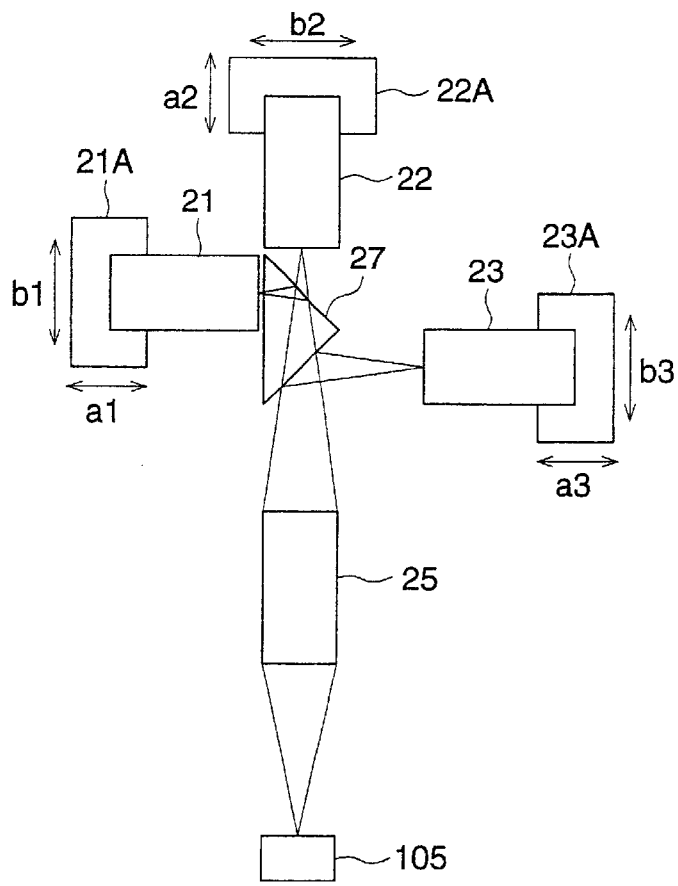
FIG. 5 is a drawing showing another example of the structure of the main part of an image exposure apparatus of an example of the embodiment of this invention.

Now, in the above-described examples of embodiment shown in FIG. 2 and FIG. 3, bundles of rays from a plurality of array light sources are mixed by using dichroic mirrors. On the other hand, it is possible to carry out the mixing of bundles of rays by using the dichroic prism 27 as shown in FIG. 5. Besides, in this structure shown in FIG. 5, the first array light source 21 to the third array light source 23 are the same as those shown in FIG. 1 to FIG. 3. Further, in the same manner, 21A denotes the position adjusting means for adjusting the positional deviation (in the b1 direction) and the focus (in the al direction) of the first array light source 21, 22A denotes the position adjusting means for adjusting the positional deviation (in the b2 direction) and the focus (in the a2 direction) of the second array light source 22, and 23A denotes the position adjusting means for adjusting the positional deviation (in the b3 direction) and the focus (in the a3 direction) of the third array light source 23.

In the above, in adjusting the focus, the array light source is moved in the direction of the optical axis, and in adjusting the exposure position, the array light source is moved in the direction perpendicular to both of the optical axis direction and the lengthwise direction of the light emitting element array.

Figure 6:
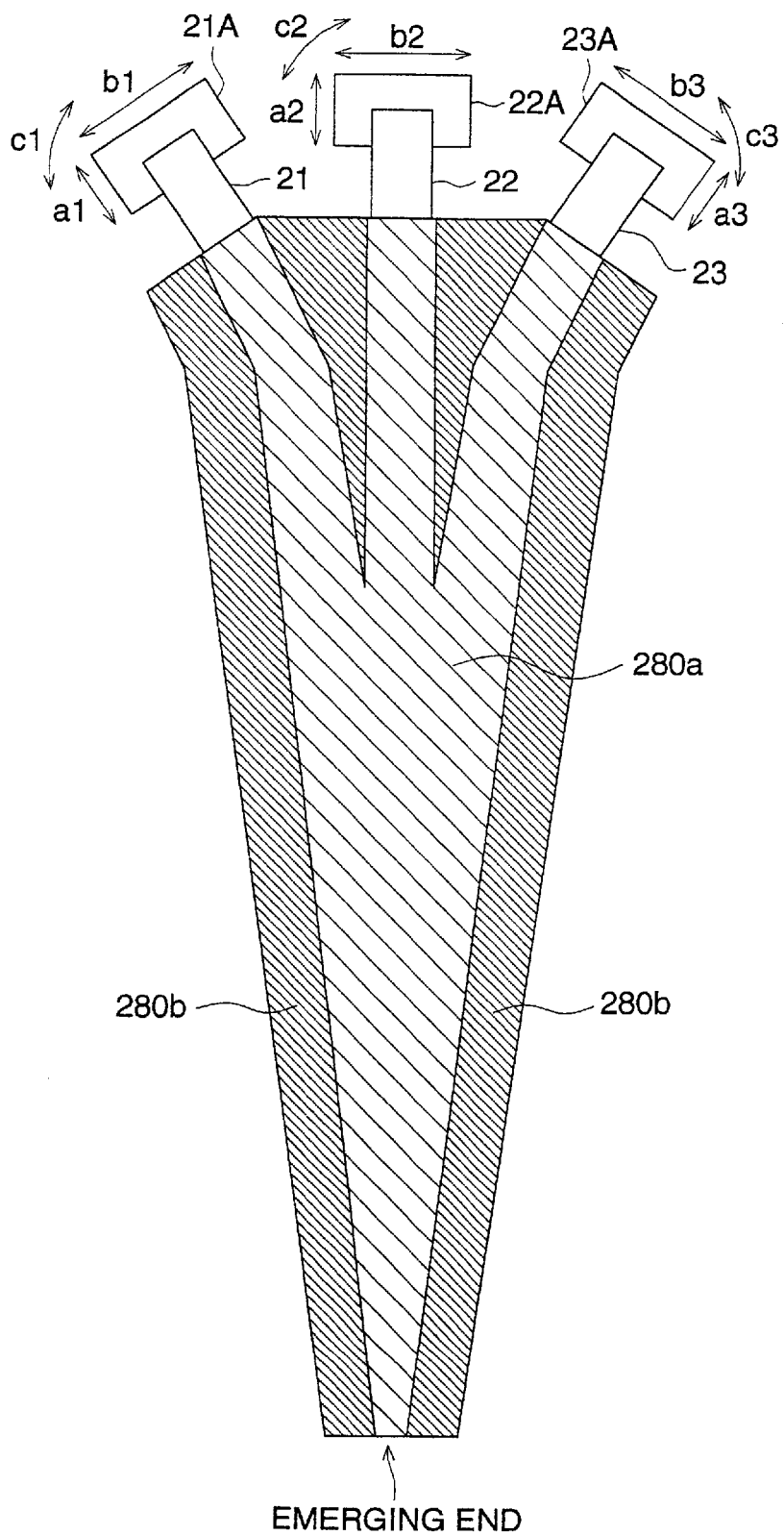
FIG. 6 is a drawing showing a further example of the structure of the main part of an image exposure apparatus of an example of the embodiment of this invention.

Further, instead of the above-described optical system using a prism etc., it is possible to use an assembled set of optical plates which are provided with a plurality of incident ends and have optical path branches inside (refer to FIG. 6). In this set, each plate is composed of the core 280*a* and the clad 280*b*.

In this case, in adjusting the focuses, the array light sources are moved in the direction of the optical axes (a1 to a3), and in adjusting the exposure positions, the array light sources are moved in the direction perpendicular to both of the optical axes and the lengthwise direction of the light emitting element arrays (b1 to b3); further, as an adjustment in other direction, the array light sources are moved (deflected) in the directions which are deflected against the incident ends (c1 to c3).

Figure 7:
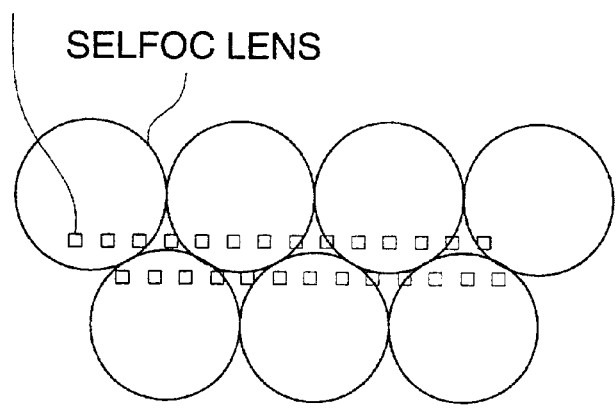
FIGS. 7(a) and 7(b) each is an illustration showing a state of the main part of an image exposure apparatus of an example of the embodiment of this invention.
Figure 7:
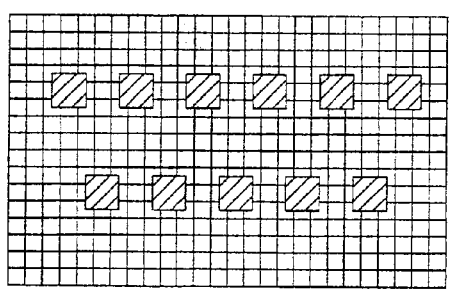

FIG. 7(*a*) is an illustration showing the size of each light emitting element included in the array light sources 21 to 23, and the size of the SELFOC lens making up the SLA 25. In this drawing, the cross-section perpendicular to the optical axis is shown.

Further, FIG. 7*b* is an illustration showing how the lights from the array light sources 21 to 23 are focused by the SLA 25 on the image sensor 105. In this drawing, the fine squares are the light receiving elements of the image sensor 105, and the portions indicated by hatching show the focused state (well-focused state) of the rays from the respective light emitting elements of the array light source. In addition, in the practical one, the image sensor has a larger area in order to cope with the positional deviation of the incident lights from the array light sources 21 to 23.

Now, the operation of adjusting the exposure position and the focus in the exposure apparatus of the example of the embodiment which is made up in this manner will be explained in detail.

First, the CPU 30 gives instructions for adjusting the exposure position and the focus to the pertinent sections. The CPU 30, which has confirmed that the photographic paper 11 is not present at the exposure position, places the image sensor 105 at the exposure position. Further, the CPU generates the image data for making the first array light source 21 to third array light source 23 emit light with predetermined intensities. These image data are separated into the image signals for the respective colors in the HDC circuit 31. For example, the HDC circuit 31 carries out the color separation for R, G, and B, to supply the R image signal to the HD circuit 41, the G image signal to the HD circuit 42, and the B image signal to the HD circuit 43.

The HD circuits 41 to 43 receive the respective color image signals from the HDC circuit 31, and generates the emission signals for making the light emitting elements of the array light sources emit lights. Further, the first array light source 21 to the third array light source 23, which have received these emission signals respectively from the HD circuits 41 to 43, carries out light emission in accordance with the respective color image signals at the same timing.

The above-described lights emitted at the same timing in the first array light source 21 to the third array light source 23 enter in the light mixing means 29. Thus, at the dichroic mirror 29a, the light from the first array light source 21 is reflected, and the light from the array light source 22 is transmitted. Further, at the dichroic mirror 29b, the lights from the first array light source and the second array light source are transmitted and the light from the third array light source is reflected. Then, as shown in FIG. 3, the mixed line-shaped emerging lights enter in the image sensor 105. In this case, as shown in FIG. 7(b), on the light receiving surface of the image sensor 105, the light forms an image in accordance with the light emitting elements of the array light sources.

Figure 8:
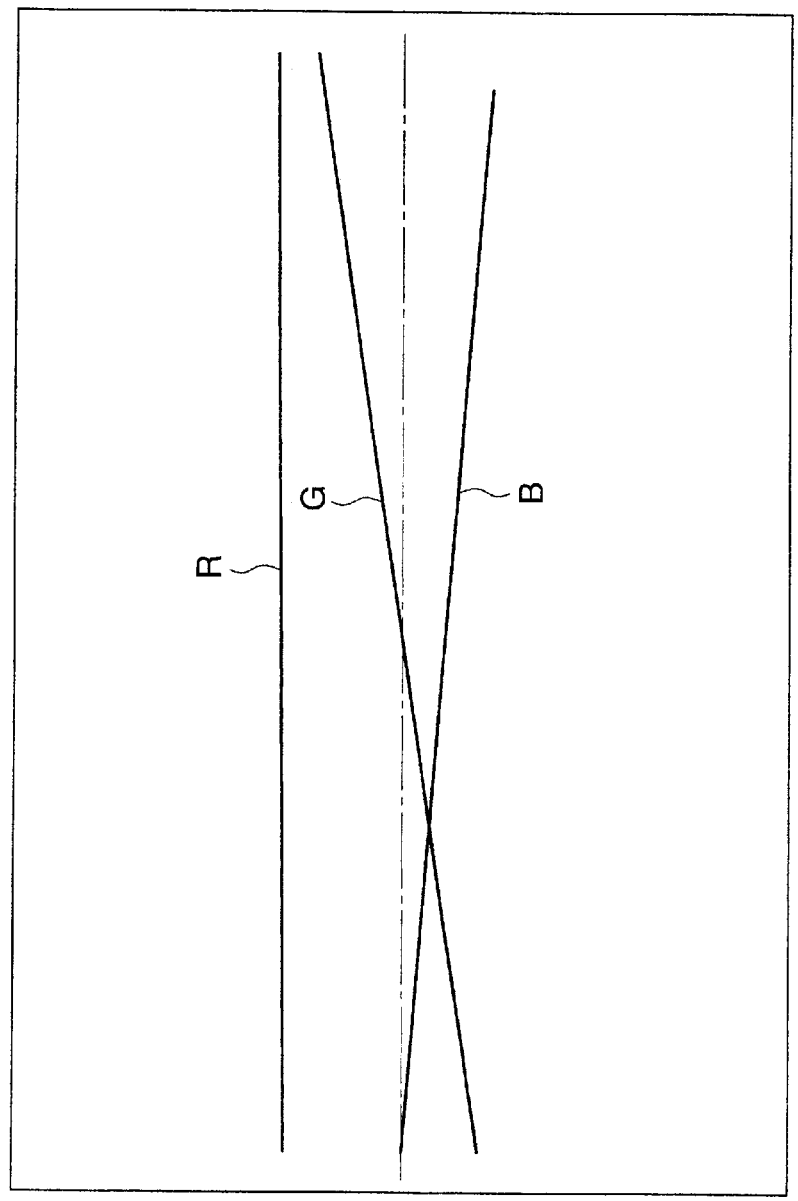
FIG. 8 is an illustration showing a state of the adjustment of an image exposure apparatus of an example of the embodiment of this invention.

FIG. 8 is an illustration showing an example of the result of receiving lights in the image sensor 105. In this FIG. 8, the single dot and a dash line in the neighborhood of the center is the basic position for making the position adjustment of the line-shaped emerging lights from the mixing means 29. Besides, in this drawing, the emerging lights from the zigzag arrangement of the elements are indicated by straight lines.

Moreover, the state shown in this FIG. 8 is displayed on the display 130, and at the same time, it is recognized as an image in the CPU 30 too.

First, the case where the adjustment of the focuses is carried out will be explained.

In the case where the adjustment of the focuses is carried out manually, with reference to the display on the display 130, the position adjusting means 21A is adjusted in the a1 direction, the position adjusting means 22A is adjusted in the a2 direction, and the position adjusting means 23A is adjusted in the a3 direction through the operation portion 140, in a manner such that each of the arrangements of the light emitting elements is clearly indicated. In the case where the adjustment of the focuses is carried out automatically, the CPU 30 controls the position adjusting means 21A in the a1 direction, the position adjusting means 22A in the a2 direction, and the position adjusting means 23A in the a3 direction using a known auto-focus processing in a manner such that each of the arrangements of the light emitting elements can be clearly sensed by the image sensor 105.

Next, the case where the adjustment of the exposure positions is carried out will be explained. In this drawing, the line-shaped emerging light for R is deviated to a position which is parallel to the basic position. Further, the line-shaped emerging light for G is deflected in such a way as to cross the basic position. Further, the line-shaped emerging light for B is deflected with one end located on the basic position and another end deviated from the basic position.

In the case where the adjustment of the exposure positions is carried out manually, with reference to the display on the display 130, the position adjusting means 21A is adjusted in the b1 direction, the position adjusting means 22A is adjusted in the b2 direction, and the position adjusting means 23A is adjusted in the b3 direction through the operation portion 140, in a manner such that the position of the displayed line-shaped emerging light agrees with the basic position. In the case where the adjustment of the exposure positions is carried out automatically, the CPU 30 controls the position adjusting means 21A in the b1 direction, the position adjusting means 22A in the b2 direction, and the position adjusting means 23A in the b3 direction using a known image recognition processing in a manner such that the position of the displayed line-shaped emerging light agrees with the basic position.

In the case of FIG. 8, because the line-shaped emerging light for R is deviated parallel to the basic position the both ends are moved, in FIG. 4, by the same amount in the direction perpendicular to the photographic paper surface (in the b1 direction). Because the line-shaped emerging light for B is deviated in such a way as to cross the basic line, the both ends are moved reverse to each other in the b2 direction. Because only one end of the line-shaped emerging light for B is deviated from the basic position, the deviated end is moved in the b3 direction.

Besides, the above-described adjustments may be carried out in the order of the adjustment of focuses first to the adjustment of the exposure positions next, or both may be carried out repeatedly.

Then, at the time when the adjustment of the focuses and the adjustment of the exposure positions have been completed, the CPU 30 fixes the instruction values for the adjustment to the position adjusting means 21A to 23A, and keeps them in the register inside the CPU. Further, the CPU makes the image sensor 105 retract to a predetermined position to be ready for the passing-through of the photographic paper 11.

As described in the above, the lights from the first array light source 21 to the third array light source 23 are adjusted for their exposure positions and focus positions, and the light composed of the simultaneous emission of lights for the respective colors can be obtained with positions of the array light sources for the respective colors R, G, and B adjusted correctly.

Accordingly, because the bundles of rays from the array light sources for the respective recording colors are put together to make exposure for one line, it is actualized an image exposure apparatus which has a simple structure of the driving circuit and an easy timing control, produces no color deviation even if a fluctuation of transport speed occurs, and is easy to be adjusted. Besides, because the mixed lights are adjusted, only one image sensor is required.

Besides, the image sensor 105 which is used in the above-described examples of the embodiment may be not a sensor used exclusively for the adjustment of the exposure positions and the focuses, but a sensor for another use may be utilized also for the adjustment. For example, it is possible to use the similar image sensor which is used for correcting the exposure amount (control of the light emission intensity of the array light sources).

Figure 9:
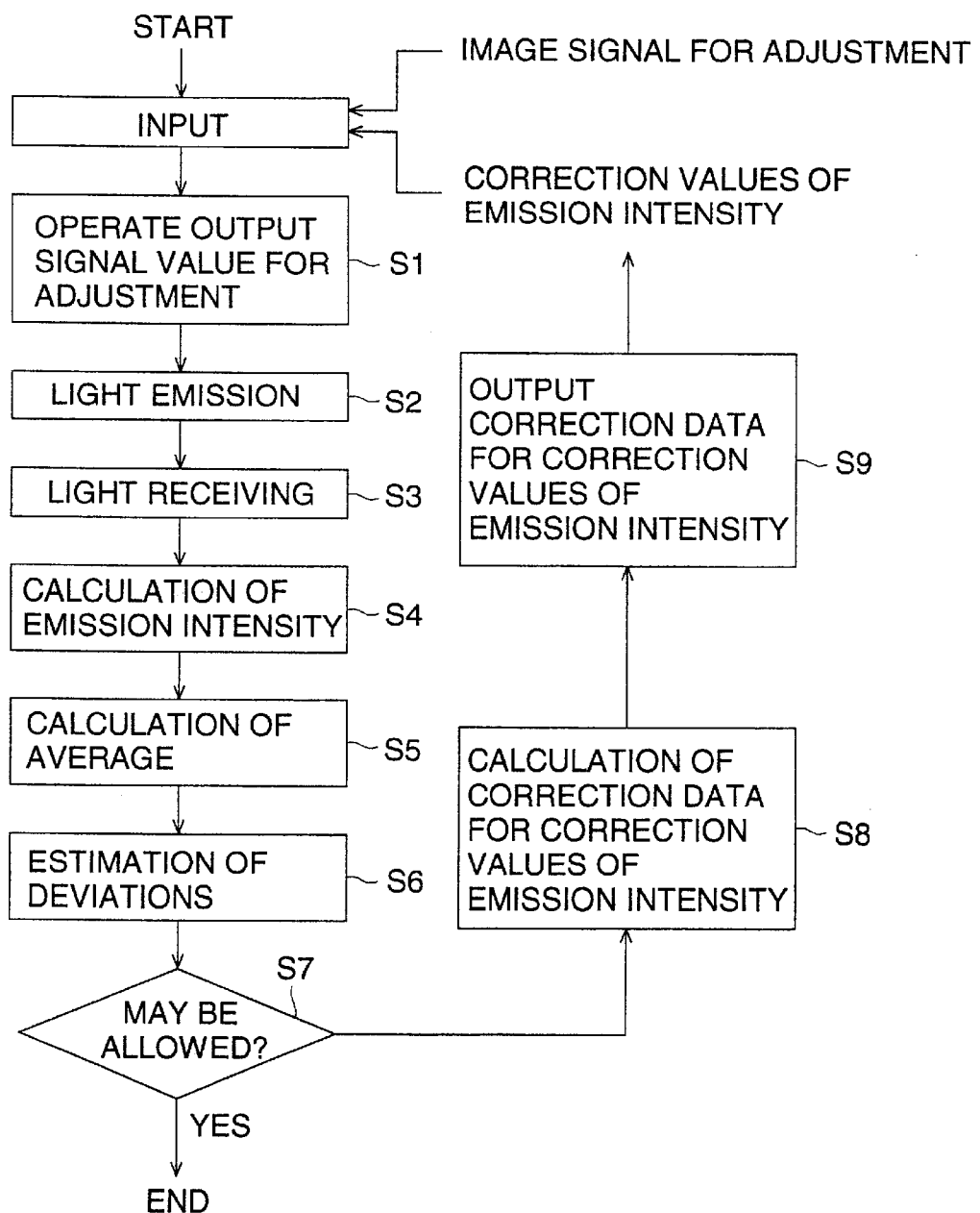
FIG. 9 is a flow chart showing the flow of the processes up to the adjustment of the light emission intensity.

In the following, the adjustment of the light emission intensity of the light emitting element array will be explained. FIG. 9 is a flow chart showing the flow of the processes up to the adjustment of the light emission intensity through calculating the data for adjusting the light emission intensity (correction data for the correction values of emission intensity) on the basis of the magnitude of the output signals from the image sensor for each of the light emitting elements.

In the above, the correction values of emission intensity means a series of data allotted to each of the light emitting elements for correcting the dispersion of the light emission intensity of the light emitting elements. In the concrete controlling of light emission, the practical output signal values for the adjustment are generated by multiplying the image signals of each pixel for the adjustment which have been sent from the outside of this image exposure apparatus by these correction values of emission intensity, and the controlling of light emission is to be carried out for the output signals by the HD circuit.

Further, for the image signal values for the adjustment, it is prepared, for example, a constant value, or the combination of the light emission pattern which is adapted to the specification of the image sensor for receiving the lights which is suitable for calculating the correction values of emission intensity as the object. In this connection, in the case where a light receiving element of the image sensor has a light receiving area which is larger than the image area formed by a light emitting element, it gives less load to the processing in the later stage if the timing of light emission for each of the light emitting elements is devised in order that bundles of rays emitted from two or more light emitting elements should not reach the same light receiving element at the same time.

The actual flow of the processes will be explained.

In the step S1, image signal values for the adjustment are operated on the basis of the correction values of emission intensity which have been read out from the register for the correction values of emission intensity, to obtain the output signal values for each of the light emitting elements.

Then, in the step S2, each of the light emitting elements in the light emitting arrays is made to emit light in accordance with the output signal values, and in the step S3, the emitted bundles of rays are received by the image sensor. In the case where the length of the light receiving portion of the image sensor is shorter than the whole length of the light emitting element array, the light emitting element arrays and the image sensor are relatively moved in order that light from all the light emitting elements may be received by the image sensor.

In the step S4, the received bundles of rays (image) are converted into the light quantity (light emission intensity in FIG. 11) of the respective light emitting elements in the light emitting arrays. In this step, in the case where the spatial unit of one light emitting element of the image sensor is smaller than the image forming area of one light emitting element, and a bundle of rays from a single emitting element is received by a plurality of light receiving elements at a single light emitting timing, it is appropriate to add a smoothing processing such as averaging the signal values from the above-described plural light receiving elements.

After the light quantity data for each of the light emitting elements are obtained, in the step S5, the average value for all the light emitting elements is obtained. Then, in the step S6, the deviation of the light quantity of each of the light emitting elements from the average light emission value is calculated. Then, the evaluation of the deviations is carried out, and if the deviations are small enough (for example, smaller than a predetermined value), the procedure comes to the end. On the contrary, if the deviation is not small enough, in the step 8, the correction data for the correction values of emission intensity for correcting the deviations are calculated. The correction data for the correction values of emission intensity are operated with the correction values of light emission, which have been used in generating the output signals for the adjustment in the image sensor, through an operation processing unit such as the CPU, and the corrected correction values of emission intensity are stored in a storage device, to be sent to the HD circuit (the step S9). Then, by repeating the similar operations until the deviations become small enough through obtaining output signal values on the basis of the correction values of emission intensity newly stored in the storage device, the adjustment of the light emission intensity can be carried out.

Incidentally, in the above-described adjustment of the light emission intensity, there are further difficult problems. That is, those are the following problems which are present between the light emission intensity of the light emitting element arrays received by the image sensor and the density produced by actually making a print on a photographic paper:

1. A non-linear characteristic in the relation between the light emission brightness and the density of the photographic paper;
2. The variation of the characteristics depending on the spatial position and the size of the image forming surface of the photographic paper which is an image recording medium;
3. The variation of the light emission quantity itself of the light emitting elements in the light source depending on the emitted light pattern.

Figure 10:
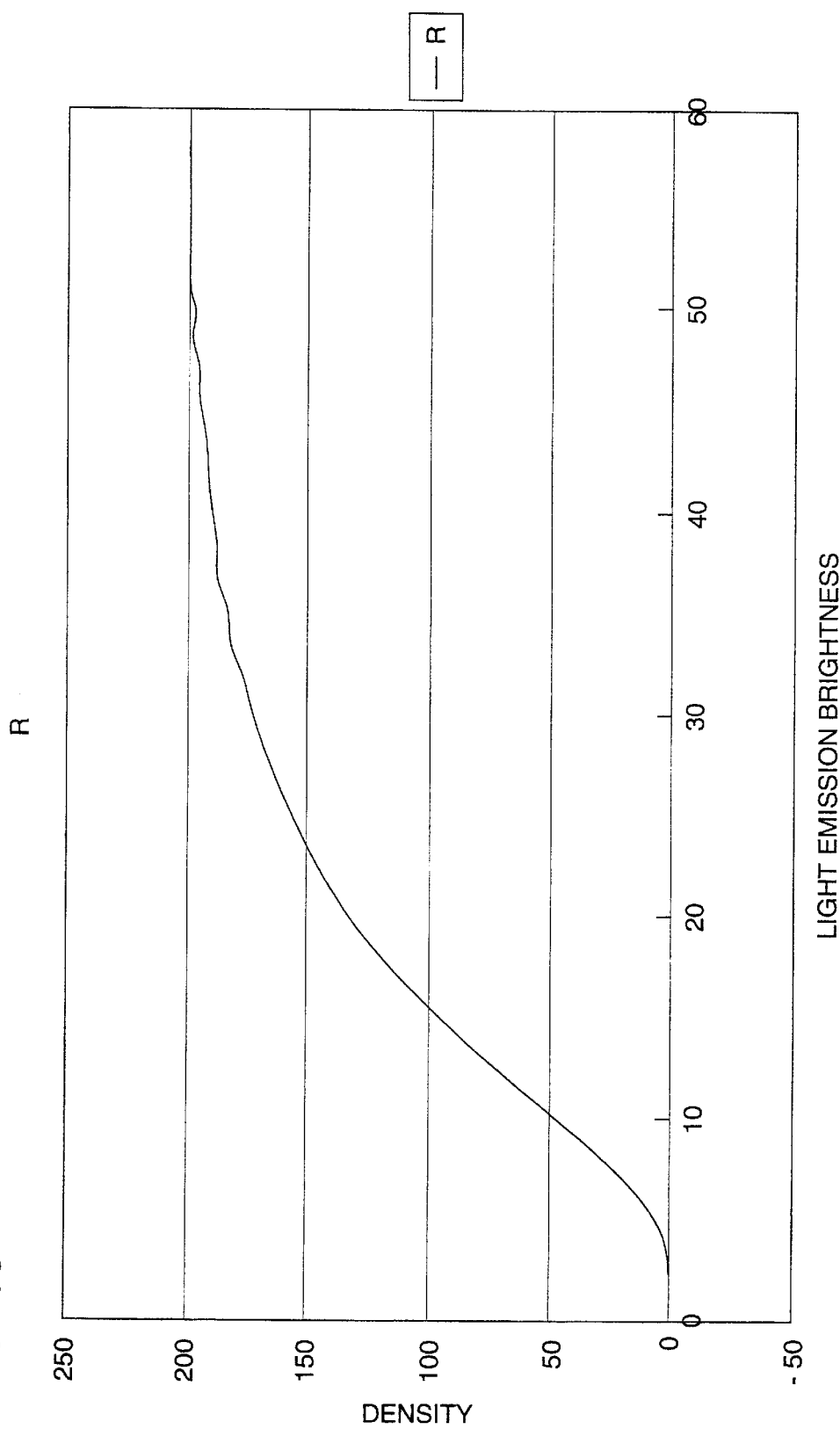
FIG. 10 is a drawing of a characteristic curve showing the relation between the light emission intensity and the density of a photographic paper.

FIG. 10 is a drawing of a characteristic curve showing the relation between the light emission intensity and the density of a photographic paper. The abscissa is for the quantity which is proportional to the output signal value. The ordinate is for the quantity which is proportional to the density on the photographic paper. It can be found that the density of the photographic paper has a non-linear relation to the output signal value. It is to be carried out through such a characteristic curve to convert the deviations of the light quantity data received by the image sensor into the correction data for the correction values of emission intensity, or to estimate the deviations.

Figure 11:
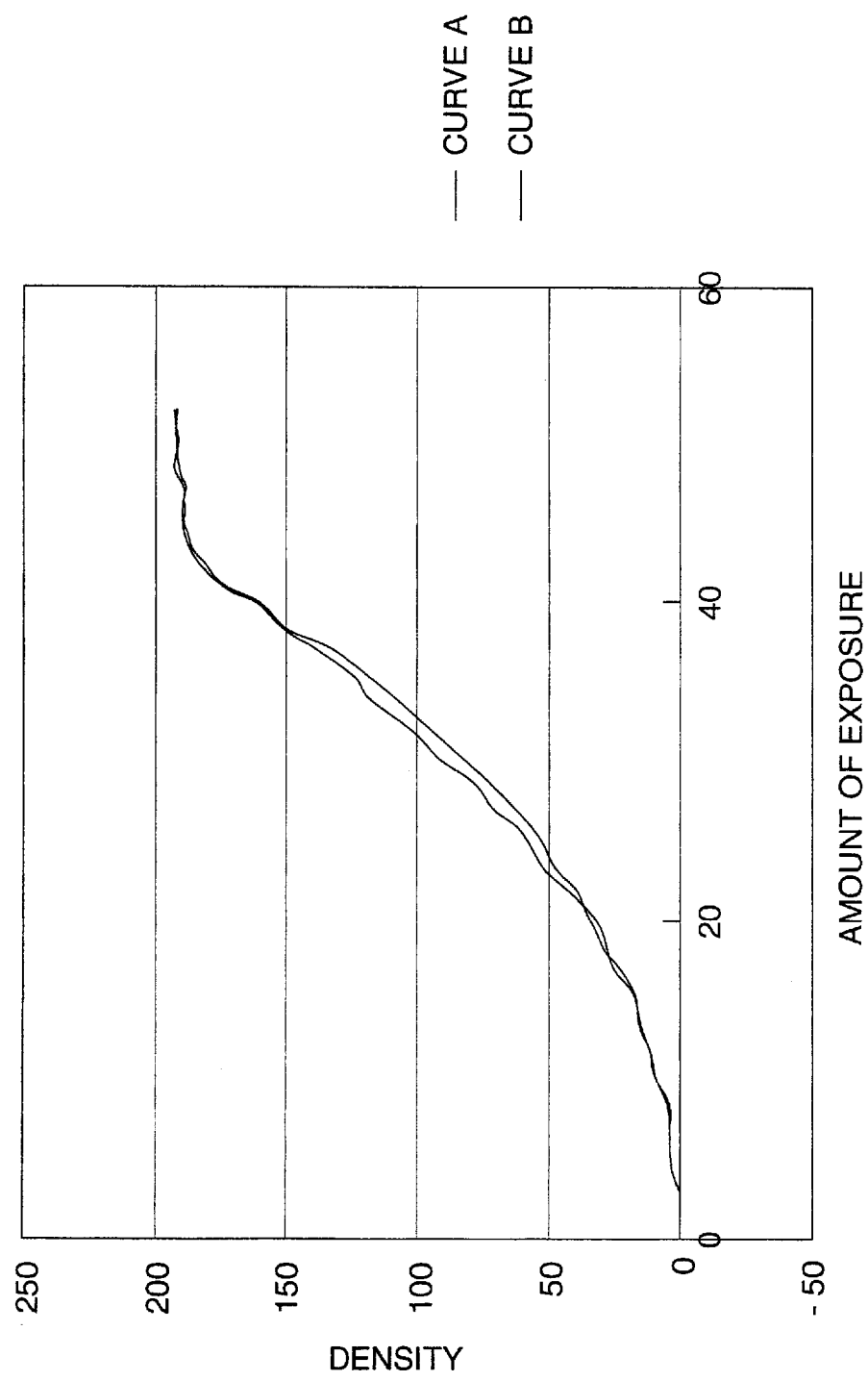
FIG. 11 is a drawing of an example showing the variation of the characteristics depending on the spatial position and the size on the image forming plane.

FIG. 11 is a drawing of an example showing the variation of the characteristics depending on the spatial position and the size on the image forming plane. The image signal value is taken in the abscissa, and the density written on the photographic paper is shown in the ordinate. In addition, the actual output signal values are the product of the image signal values multiplied by a non-linear characteristic factor which is not shown here. In this drawing, the curve A shows the normal light quantity characteristic of the light emitting element array selected as a sample, and the curve B (ESTB*2 ND 0.3) shows the characteristic in the case where a filter having a constant spectral transmittance distribution for reducing the light quantity to a half is inserted between the same light emitting element array and the photographic paper, and in return, the emission time is multiplied by two. Accordingly, the time for forming a pixel in the curve B is about two times the time in the curve A, that is, because the photographic paper is moved at a constant speed during the period, the drawing shows the difference of the characteristic to the case where the size of the pixel in the direction of sub-scanning, the transporting direction of the paper, is virtually made twice with the exposure amount kept the same. A similar problem is produced also by the dispersion of the size of the light emitting elements in the light emitting element array and the state of focus on the image forming plane. Moreover, it is produced also by the reciprocity law failure characteristic of the photographic paper. Accordingly, for the problems of this kind, it is necessary to estimate the deviations by measuring also the state of image forming and the information on the position on the image forming plane at the same time. Besides, for the characteristic of the image sensor, it is appropriate to make a correction through a table which makes the output of the image sensor be in a proportional relation to the light emission intensity.

FIG. 12 is a drawing showing a table used for comparing the light quantity depending on the emission pattern of the light emitting element arrays. In the row of Inter1, a light quantity measured in the case where all the elements are made to emit light is filled in. In the row of Inter2-1, a light amount measure in the case where the (2n+1)-th elements (n denoting an integer) of all the elements in the array are made to emit light is filled in, and in the row of Inter2-2, a light quantity measured in the case where the 2n-th elements are made to emit light is filled in. In the same way, light quantity data measured in the cases where all the elements in the array are divided into four groups, and into eight groups and the elements in each group are made to emit light independently of other groups are filled in. If there is no variation of light quantity depending on the emission pattern, it is estimated that the following equations hold correct:

$$\begin{aligned}\text{Inter1} &\cong \text{Inter2-1} + \text{Inter2-2} \\ &\cong \text{Inter4-1} + \text{Inter4-2} + \text{Inter4-3} + \text{Inter4-4} \\ &\cong \text{Inter8-1} + \text{Inter8-2} + \text{Inter8-3} + \text{Inter8-4} + \\ &\quad \text{Inter8-5} + \text{Inter8-6} + \text{Inter8-7} + \text{Inter8-8}.\end{aligned}$$

However, the above-described relational expressions may not hold correct. In the case where the dispersion of the light quantity of the light emitting elements lowers the image quality, it appears in the area of constant density which is generally called a solid image. Accordingly, in obtaining the light quantity for the adjustment of the light emission intensity, it is desirable to obtain it for the pattern with which the actual image is formed, where the pattern with which the actual image is formed means the one in the case where a constant density image is formed; for example, in the apparatus in which an image is recorded by making a control such that the timing of light emission is made different between the $(2n+1)$-th elements and the $2n$th elements, it is desirable to carry out the recording by controlling the light emitting elements in the same manner as in the case where an image is actually recorded.

On the other hand, in the case where a light receiving element such as a photo-multiplier which obtains light intensity with an area larger than the area of the light emitting element in the image forming plane is used, it is necessary to catch substantially the bundle of rays by making each of the light emitting elements emit light independently of others, which makes it difficult to solve the above-described problems 2 and 3; however, as described in the above, in the case where a bundle of rays from each of the light emitting elements is caught by more than one light receiving elements, the light emission intensity can be obtained precisely.

Further, as will be explained in the following, solving such problems is accomplished by calculating the data for correcting a very small difference of the position which is difficult to be adjusted by the adjustment of the positions of the light emitting element arrays in the image exposure apparatus and the data for correcting the linearity of a light emitting element array itself simultaneously with the data for the adjustment of the light emission intensity of each of the light emitting elements. Further, the problem concerning the mounting of the light emitting element arrays can be solved at the same time. In the following, detailed explanation will be given.

Figure 13:
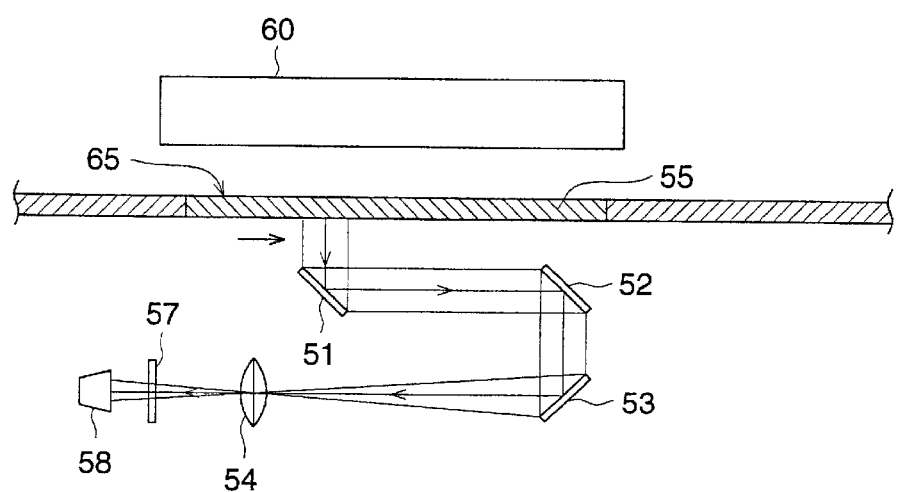
FIG. 13 is a drawing showing the structure of the light receiving portion.

FIG. 13 is a drawing showing the structure of the light receiving portion. The lens 54 forms the image on the image forming plane 65 of the light emitting element arrays 60 again on the light receiving element through the mirrors 51, 52, and 53. The mirror 51 has a mechanism for scanning the image forming plane 65 in the direction of the array of the light emitting element array, and the mirrors 52 and 53 have a mechanism for moving in the same direction as the mirror 51 at a half speed of the mirror 51. Owing to this, scanning can be done without varying the optical distance of the lens. By having such a scanning mechanism, the width of the opening of the window 55 of the image forming plane of the light emitting element array can be made much smaller than in the case where the light receiving element itself is moved along the image forming plane 65 of the light emitting element arrays. Further, it is possible to close this window 55 by a glass plate. By doing this, the risk of a paper jam which possibly occurs in transporting a sheet of photographic paper owing to the presence of a portion like a window on this place which is the surface to be passed by a photographic paper sheet can be suppressed to a minimum. Further, by making a scan by the mirrors, it is not necessary to move the light receiving element and the image forming lens, hence, members for the movement can be made small. Besides, because an optical system like this is of the same kind as those used generally in copying machines or the like, it can be actualized with a very low-cost parts required.

Further, this light receiving portion 58 can cope with the need of maintenance operations such as the exchange of the members in the light emitting element arrays because it is attached to the exposure portion, and further, because it scans the actual image forming plane, measurement of light can be carried out in the same condition as the actual writing, which makes it possible to do a precise measurement. Furthermore, the light receiving portion has the same effect if it is attached to the exposure portion in a manner to be capable of being detached, and further, it is possible to be dismounted when it is not necessary as at the time of actual image recording or in some other cases like that, it is prevented that the light receiving portion becomes obstructive.

For the light receiving portion (section) 58, a line CCD sensor 59 is used. In FIG. 13, a line-shaped light dot group having a length corresponding to the light receiving width of the mirror 51 is formed on the light receiving section 58 by the mirrors 51, 52 and 53 and the lens. Therefore, the line CCD sensor 59 is arranged vertically in the light receiving section 58. Accordingly, when the mirror 51 moves in the arrowed direction on the main scanning line, the line-shaped light dot group moves from the bottom section to the top section of on the line CCD sensor 59. By using a line CCD sensor 59, it is possible to calculate precise correction data for light emission intensity, because it is not necessary, owing to the smaller-sized minimum light receiving unit in comparison with the other light receiving elements, to make the measurement of light while carrying out the control of light emission which is not based on the actual operation. Besides, in comparison with the area type CCD sensor, the line CCD sensor has a higher sensitivity and lower noise, and on top of it, the number of data obtained by measurement at a time is smaller, which makes the time for operation processing shorter.

Figure 14:
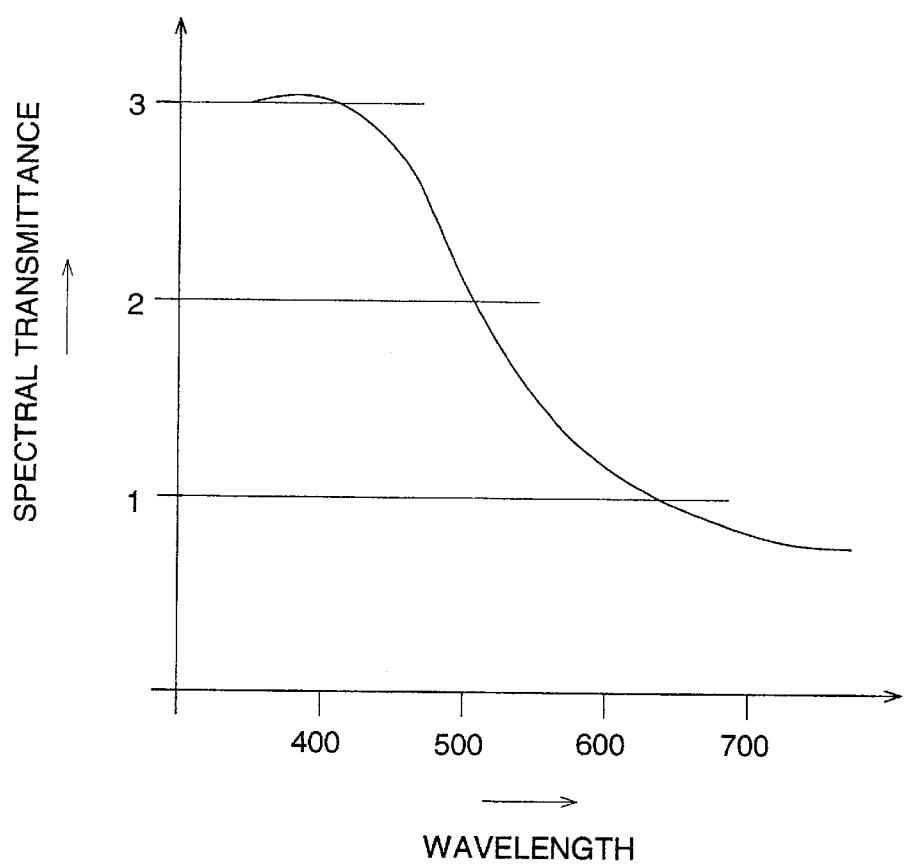
FIG. 14 shows the spectral transmittance distribution of the filter 57 disposed midway in the optical path of the light receiving portion.

FIG. 14 shows the spectral transmittance distribution of the filter 57 disposed midway in the optical path of the light receiving portion. The light emission brightness of the light emitting element arrays has a magnitude adapted to the spectral sensitivity distribution of the photographic paper. The filter is one for adjusting the output of the light receiving element which varies depending on the difference of color to approximately the same output. Owing to this, the dynamic range for the light receiving element, which varies depending on the difference of color, can be kept approximately constant, and it is possible to observe the three colors simultaneously. Generally speaking, in a system using a CCD sensor, in many cases an electronic shutter is used for such an adjustment of sensitivity; however, if this method is employed, it becomes difficult to make the simultaneous observation, and it is necessary to vary the speed of the mirror system which is moved in synchronism, which requires a complicated mechanism, and on top of it, produces a new problem that the influence of the fluctuation of the transport speed accompanied by the movement of the mirror system becomes different for each of the colors. Contrary to the above, according to this embodiment, by providing a filter, it is possible to solve those problems.

Figure 15:
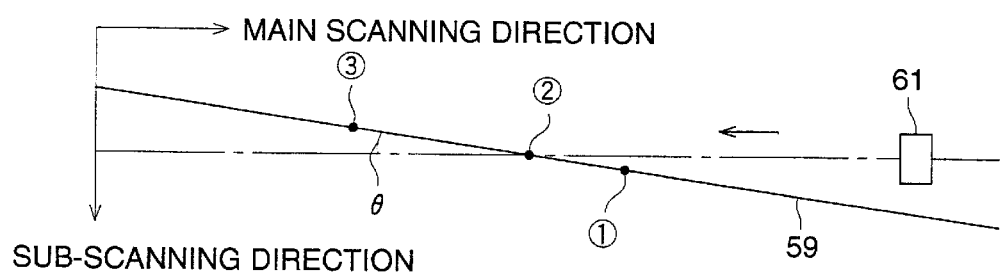
FIG. 15 shows a situation at the image forming position of the light emitting element arrays.

FIG. 15 shows a situation that a light dot 61 in the the light emitting element array focused on the light receiving element array by the mirrors 51, 52, 53 and the lens 54 moves on the light receiving element array.

Figure 16:
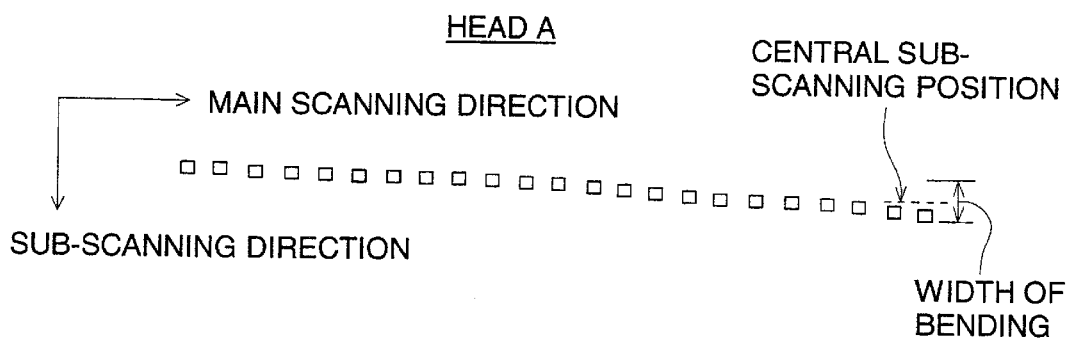
FIGS. 16(a), 16(b) and 16(c) show the situations that the light receiving element array is projected on the image forming plane of the light emitting element arrays by the mirror and lens of the light receiving portion.
Figure 16:
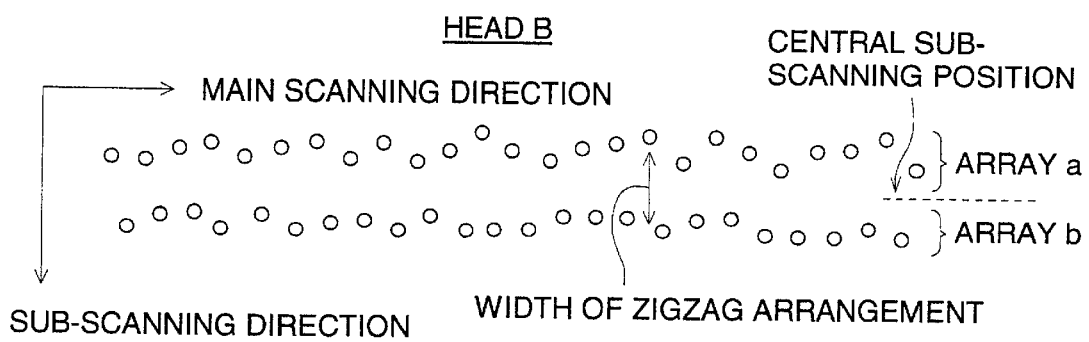
Figure 16:
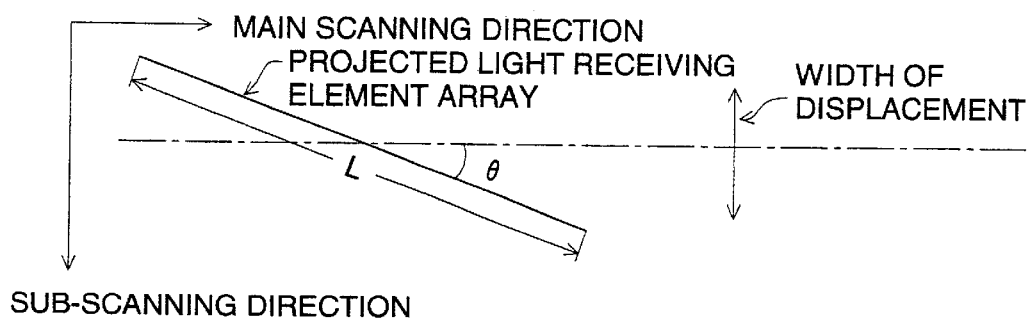
Figure 17:
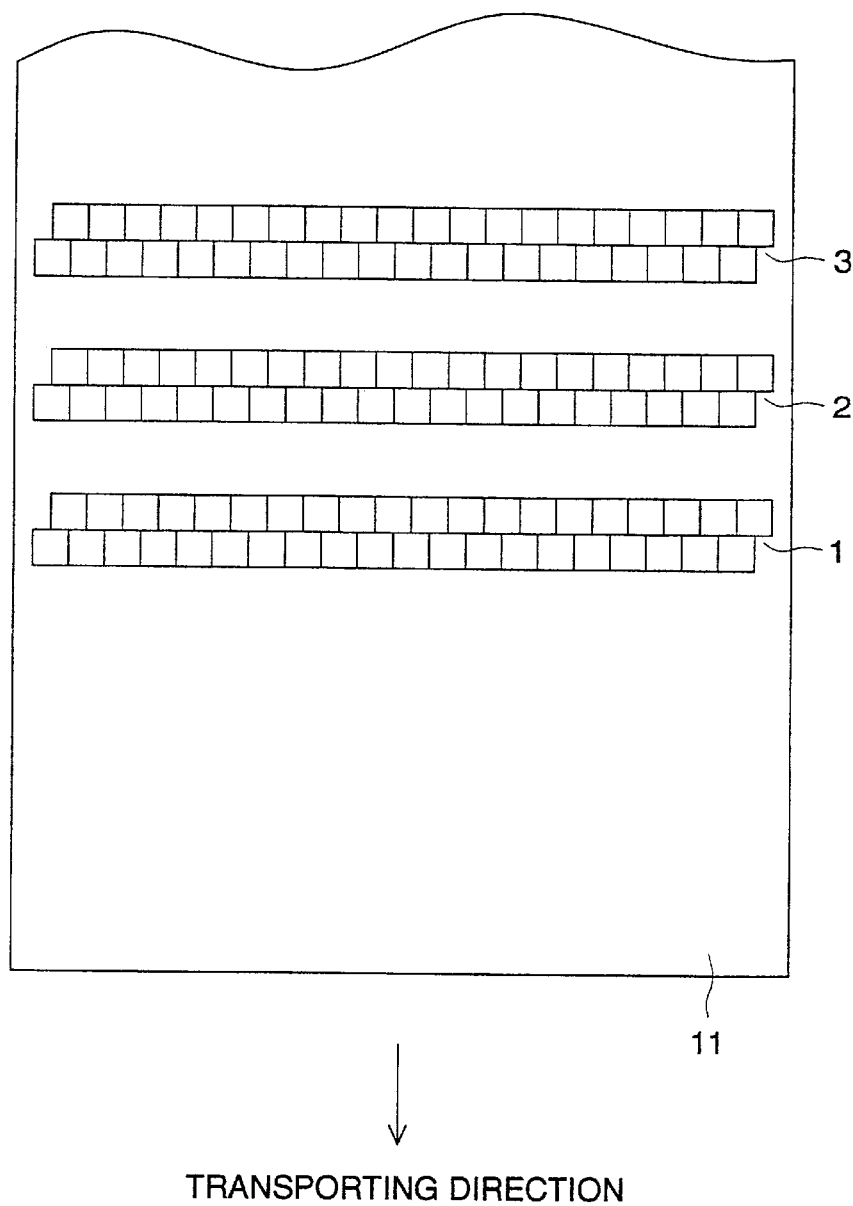
FIG. 17 is an illustration showing how an image is formed in a conventional image exposure apparatus.
Figure 18:
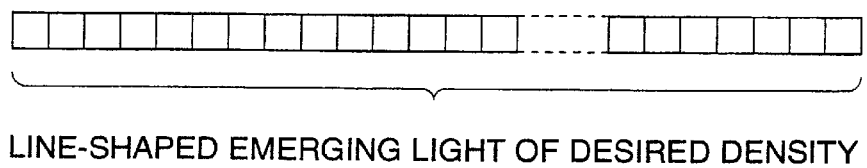
FIG. 18 is an illustration for illustrating the structure of the light source for obtaining a line-shaped emitted light having the desired density.
Figure 19:
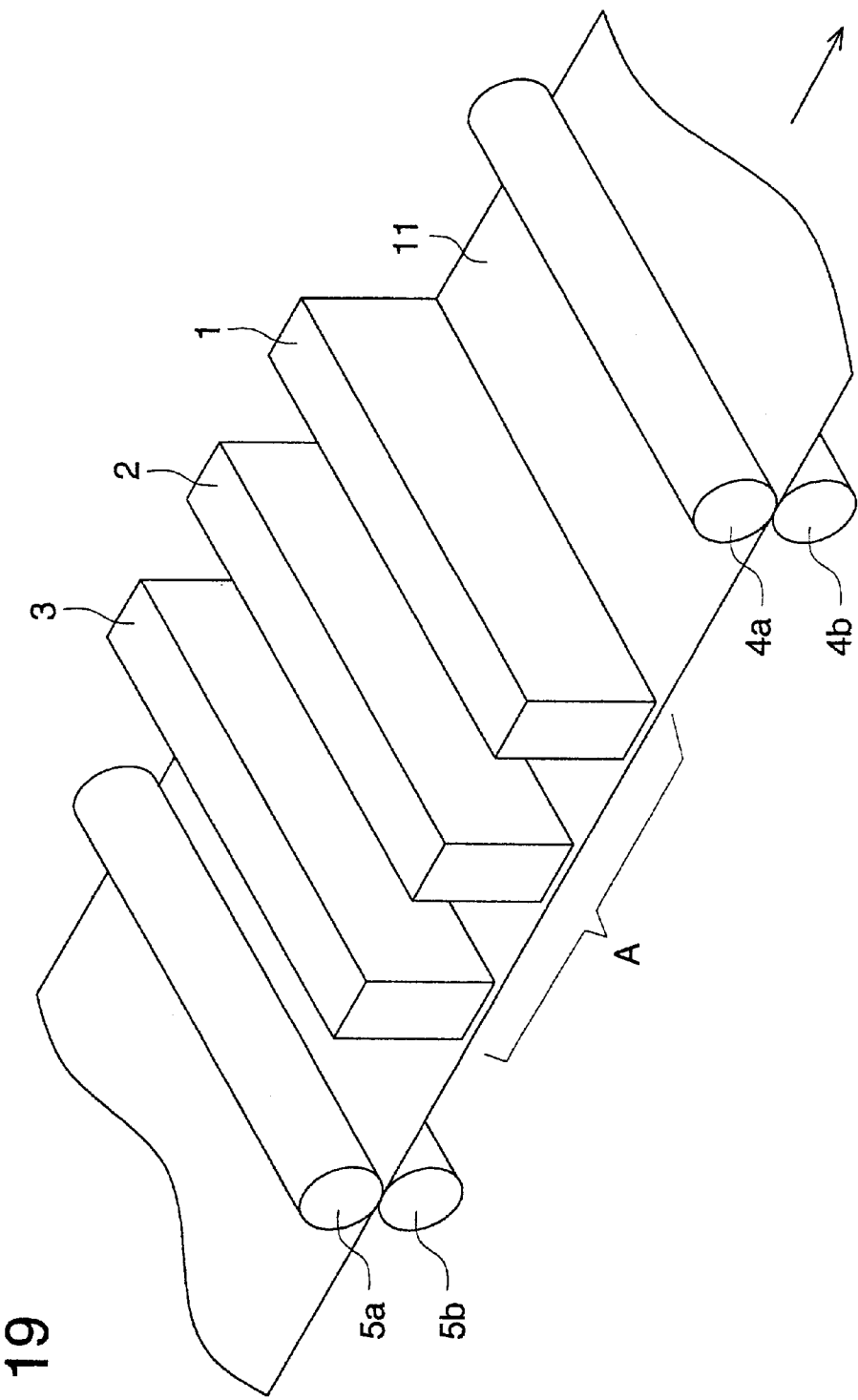
FIG. 19 is an illustration showing how an image is formed in a conventional image exposure apparatus.

In this structure, on the image forming plane of the light receiving element side, the array of the light receiving elements of the line CCD sensor 59 is slightly inclined with respect to the scanning direction. It is desirable that this inclination of the light receiving element array has an angle which makes the width of the light receiving portion of the light receiving element array in the sub-scanning direction larger than the width of the displacement in the sub-scanning direction corresponding to the width of the zigzag arrangement of the light emitting element array or the width of the bending of the head (or the width of the bending of the light emitting element array) added by the size tolerances in mounting. FIG. 16(c) shows the situation that the light receiving element array is projected on the image forming plane of the light emitting element arrays by the mirrors 51–53 and lens 54. In FIG. 16(a), the arrangement on the image forming plane of the light emitting element array of the head A having a bending is shown by the rectangle marks, and in FIG. 16(b), the arrangement on the image forming plane of the light emitting elements of the head B having a zigzag arrangement of the elements is shown by the circle mark. In this example, the head A and the head B are adapted so as to form the respective images on the same image forming plane at the same time, but they are separately shown in FIG. 16(a) and FIG. 16(b) for the convenience of explanation. In the above, the width of the zigzag arrangement, for example, as shown in FIG. 16(b), in the case of two lines of zigzag arrangement, corresponds to the distance between the central position of the element which is located farthest reverse to the array b in the sub-scanning direction and the element which is located nearest to the array b in the sub-scanning direction among the elements of the array a and the central position of the element which is located farthest reverse to the array a in the sub-scanning direction and the element which is located nearest to the array a in the sub-scanning direction among the elements of the array b. Further, the central sub-scanning position of the head B means the central point of the above-described central position of the array a and central position of the array b. The central sub-scanning position of the head A means the central position between the element which is located, owing to the bending of the head A etc., at the most upstream side in the sub-scanning direction (that is, the lower side in the drawing) and the element which is located at the most downstream side in the sub-scanning direction (that is, the upper side in the drawing). The width of the bending of the head A means the distance between the above-described two elements. As shown in FIG. 16(c), in this case, the angle of inclination θ of the light receiving element array is determined by the width of the displacement D (the range necessary for image sensing in the drawing) which is the larger one on the basis of the specification between the width of the zigzag arrangement of the head B and the width of the bending of the head A added by the tolerance in the relative mounting position of the head A and the head B in the sub-scanning direction and further added by the tolerance in the relative mounting position of the light emitting portion and the light receiving portion and the length L (the range of the projection in the drawing) of the light receiving element array when it is virtually projected on the image forming plane of the light emitting element arrays by the mirror and lens of the light receiving portion. In the embodiment shown in FIG. 15, when the mirror 51 moves in the main scanning direction, the light measurement for a single light dot 61 of a single light emitting element is started from the point (1) where the single line dot 61 comes in the line CCD sensor 59, further the single light dot 61 moves on the point (2), and then the light measurement for the single light dot 61 is completed at the point (3) where the single dot 61 goes away from the line CCD sensor 59. During this light measurement, the single light dot is measured by 200 times by 200 pieces of CCD.

By making such an arrangement, it becomes possible to correct the dispersion of the sensitivity among the CCD pixels, also to absorb the problems in the zigzag arrangement and linearity of the light emitting element arrays, and further to calculate the detailed data of them. Further, it also becomes possible to measure the very small deviation in the sub-scanning direction and the subtle difference of the focuses of the light emitting element arrays. In the following, on the basis of the result of the detection by the CCD sensor, which is an image sensor, the calculation of each of the parameter for adjusting the position in the sub-scanning direction, parameter for adjusting the position in the main scanning direction, the parameter for adjusting the focuses, etc. and the method of correction of these will be explained.

The light receiving element array is slightly tilted in the sub-scanning direction against the main scanning direction of the light emitting element arrays (in this example of practice, it is tilted about to a degree such that $\tan\theta = 1/50$: a distance corresponding to a single element is shifted in the sub-scanning direction per 50 elements). Further, the light emitting element arrays have a structure of 300 dpi, while the light receiving element array has a structure equivalent to 1200 dpi. That is, as shown in FIG. 3, the size of a light dot of a light emitting element is reduced to ¼ on the image receiving element array. To state it more concretely, the inclination of $\tan\theta = 1/50$ can cope with the width of the displacement D of about 12 pixels of the light emitting element array in the sub-scanning direction. Further, since the width of the zigzag arrangement in the sub-scanning direction in this example of practice is equivalent to four pixels, and the maximum width of the bending of the light emitting element array is equivalent to two pixels, the width of displacement of the light emitting element arrays can be measured sufficiently. That is, by calculating the precise sub-scanning position of the light emitting element from the position of the pixel in the light receiving element array in the main scanning direction detected by the light receiving element array and the angle θ, the linearity of the light emitting element arrays can be detected.

The light emitting element in the central portion (2) in FIG. 15 is sensed by the four light receiving elements. Further, for the adjacent light emitting element, it is deviated very little in the sub-scanning direction, but owing to the small angle of inclination, and is sensed also by the four light receiving elements in the same manner as the above-described light emitting element. In such a situation, the line-shaped dot group of the light emitting element array moves gradually on the light receiving element array by the movement of the mirrors as described in the foregoing. The resolution of this movement is equivalent to 1200 dpi. In this case, the light emitting elements are regarded as moving by a length of one pixel of the light receiving element for each light measurement. Further, the size of the light emitting element on the light receiving element surface is four times larger than that of the light receiving element. In the case where both of the light emitting element and the light receiving element are shaped in rectangular, a single dot of a single light emitting element is to move over the area of about $\frac{1}{16}$ of the light receiving element array from the start of being caught by the light receiving element array at the point (1) in FIG. 15 to the end of it at the point (3). This amount corresponds to it that the 200 light receiving elements catch the light dot of the single light emitting element in the case of a light receiving element array having 3200 elements. In such a situation, it is thinkable that the m-th light receiving element in the nth sensing and the (m+1)-th light receiving elements in the (n+1)-th sensing sense the same light emitting element, and the dispersion of sensitivity in the light emitting elements is successively corrected. Besides, in practice, several output signals are further compared, to make the correction of the light receiving element array, which is not referred to herein.

In the following, the calculation of the position of the light emitting element in the main scanning direction will be explained. In a single time of light measurement, the measurement for 50 elements of a light emitting element array can be made from the inclination of the light receiving element array and the size of the light receiving element and light emitting element, and the respective central positions of the light emitting elements can be estimated. This should be carried out for light measurement. In addition, it is important that for the central position to be estimated at this time, the position between a light receiving element and another light receiving element should be estimated, not the position based on the unit of a light receiving element, from the light intensity received by the light receiving elements. By repeating the above-described calculation for all the light emitting elements successively, the situation of the movement of the light emitting element on the surface of the light receiving element array can be grasped. Thus, the most suitable value for the distance between the neighboring light emitting elements is calculated on the premise that the distance between the neighboring elements is constant. In this connection, in the case of neighboring light emitting elements, a result having a small error of measurement can be obtained, because 200 times of measurements can be successively made in approximately 200 light receiving elements. The information on the position in the main scanning direction is an important parameter to calculate the data for correcting the light emission intensity and is delivered to the operation processing portion.

In the following, calculation of the position of the light emitting element in the sub-scanning direction will be explained. First, the distance from the light receiving element which begins to catch the light spot at the point (1) in FIG. 15 to the element which finishes the catch of the light at the point (3) is calculated. Then, the position of the light receiving element located at the center of this distance in the main scanning direction is calculated. The difference between this position of the light receiving element in the main scanning direction and the ideal position of the light receiving element in the main scanning direction (the position of the light receiving element in the main scanning when it receives the light spot of a light emitting element array which is mounted with the designed dimensions and has no bending and zigzag arrangement), is multiplied by the interval of the light receiving elements in the array and further by $\tan\theta$ and the optical magnification, to obtain the product value, from which the position of the light emitting element in the sub-scanning direction can be obtained.

Besides, when the position in the main scanning direction on the light receiving element array is obtained, the position data of the light emitting element array in the main scanning direction should be taken into consideration. In this way, the position of the light emitting element in the sub-scanning direction can be precisely measured. The information on the position in the sub-scanning direction which is obtained in the above is transmitted to the HD circuit board for controlling the light emission of the light emitting elements, and the HD circuit board adjusts the timing of the light emission for each of the light emitting elements on the basis of this information. Further, with respect to the focus, it can be used as an index the above-described distance between the light receiving elements in the array which has been calculated at the time of calculating the position in the sub-scanning direction. That is, if it is longer than the estimated range of distance, the focus is judged as deviated, and mounting of the light emitting element array is adjusted. Further, because it is a data which is indispensable to the adjustment of the light emission intensity as the position in the main scanning direction, it is immediately delivered to the operation processing portion. Besides, in this example, it is also possible to shift the resolution of the mirror scanning from 1200 dpi in order to reduce the quantizing error; however, the detail will not be explained.

As has been explained in detail, according to the embodiments of the invention described in this specification, the following effects can be obtained.

In this invention, bundles of rays from a plurality of array light sources are mixed by a light mixing means and made to emerge from it, to form line-shaped emerging lights composed of a plurality of mixed bundles of rays. Further, through making the adjustment of the positions of the light emitting element arrays by the adjusting means, adjustment to correct positions and focus adjustment are made possible.

Accordingly, because the bundles of rays from the respective array light sources are put together to make exposure for one line, it is actualized an image exposure apparatus which has a simple structure of the driving circuit and an easy timing control, produces no color deviation even if a fluctuation of transport speed occurs, and is easy to be adjusted.

Further, the light receiving means is capable of receiving light for both the control of the light emission intensity of the light emitting element arrays and the adjustment of the exposure positions and the focuses; hence, by using the light receiving means for controlling the light emission intensity of the light emitting element arrays in the adjustment of the exposure positions and the focuses, the structure can be simplified.

What is claimed is:

1. An image exposing apparatus for exposing an image onto a light sensitive material, comprising:
   a plurality of light beam emitting element arrays, each light beam emitting element array emitting aligned-light beams which are aligned in at least a single line;
   a light mixing device which mixes a plurality of aligned-light beams emitted from the plurality of light beam emitting element arrays and which emits mixed-aligned-light beams which are aligned in the same line;
   a light receiving device including a plurality of light receiving elements aligned in at least a single line and located so as to receive the mixed-aligned-light beams at a position where the light sensitive material is exposed; and
   an adjusting device which adjusts a position of each of the plurality of light beam emitting element arrays based on a light receiving result by the plurality of light receiving elements.

2. The image exposing apparatus of claim 1, wherein the position adjusting device conducts an exposing position adjustment which adjusts an exposing position of each of the plurality of aligned-light beams emitted from the plurality of light beam emitting element arrays and a focusing position of each of the plurality of aligned-light beams at the position where the light sensitive material is exposed.

3. The image exposing apparatus of claim 1, wherein the light receiving device receives light beams in order to conduct a control for light emission intensity of the plurality of light beam emitting element arrays and in order to conduct an exposing position adjustment and a focusing position adjustment.

4. The image exposing apparatus of claim 1, wherein the light receiving device is detachably provided to the image exposing apparatus.

5. The image exposing apparatus of claim 1, wherein the light receiving device comprises a CCD (charge-coupled device).

6. The image exposing apparatus of claim 1, wherein the adjusting device corrects a light amount for each element of the plurality of light beam emitting element arrays based on the light receiving result of the light receiving device.

7. The image exposing apparatus of claim 1, wherein the light receiving device comprises light receiving elements and an optical system to transmit light beams emitted on an image forming surface of the plurality of light beam emitting element arrays and to focus the transmitted light beams on an image forming surface of the light receiving elements.

8. The image exposing apparatus of claim 5, wherein the CCD is a line CCD.

9. The image exposing apparatus of claim 8, wherein the light receiving device has a structure that the line CCD is inclined so as to cover an arrangement width of a zigzag-arranged light beam emitting element array and a warping width of a light beam emitting element array.

10. The image exposing apparatus of claim 7, wherein the optical system comprises a scanning mirror to scan the image forming surface of the image forming surface of the plurality of light beam emitting element arrays.

11. The image exposing apparatus of claim 7, wherein the light receiving device further comprises color filters to adjust a sensitivity for respective colors.

12. The image exposing apparatus of claim 7, wherein the light receiving device detects positional deviations along a sub-scanning direction perpendicular to the light beam emitting element array and automatically produces control parameters.

13. The image exposing apparatus of claim 7, wherein the light receiving device detects focusing errors as positional deviations in an optical axis.

14. An image exposing apparatus for exposing an image onto a light sensitive material, comprising:

a plurality of light beam emitting element arrays, each light beam emitting element array emitting aligned-light beams which are aligned in at least a single line;

a light mixing device which mixes a plurality of aligned-light beams emitted from the plurality of light beam emitting element arrays and which emits mixed-aligned-light beams which are aligned in the same line;

a light receiving device located so as to receive the mixed-aligned-light beams at a position where the light sensitive material is exposed; and an adjusting device which adjusts a position of each of the plurality of light beam emitting element arrays based on a light receiving result by the light receiving device, wherein the light receiving device detects an inclination and a warp in the light beam emitting element array.

* * * * *